United States Patent [19]

Chraplyvy et al.

[11] Patent Number: 5,225,922
[45] Date of Patent: Jul. 6, 1993

[54] OPTICAL TRANSMISSION SYSTEM EQUALIZER

[75] Inventors: Andrew R. Chraplyvy, Matawan; Jonathan A. Nagel, Freehold; Robert W. Tkach, Little Silver, all of N.J.

[73] Assignee: AT&T Bell Laboratories, Murray Hill, N.J.

[21] Appl. No.: 796,512

[22] Filed: Nov. 21, 1991

[51] Int. Cl.[5] .......................................... H04B 10/12
[52] U.S. Cl. .................................... 359/124; 359/161
[58] Field of Search ............... 359/110, 124, 143, 153, 359/158, 161, 179, 116, 173, 133

[56] References Cited

U.S. PATENT DOCUMENTS

| Re. 33,474 | 12/1990 | Schembri | 359/125 |
| 5,060,302 | 10/1991 | Grimes | 359/161 |

FOREIGN PATENT DOCUMENTS

| 0216214 | 4/1987 | European Pat. Off. | 359/161 |
| 2752688 | 5/1979 | Fed. Rep. of Germany | 359/110 |
| 3534990 | 4/1987 | Fed. Rep. of Germany | 359/110 |
| 0021936 | 1/1991 | Japan . | |

Primary Examiner—Edward L. Coles, Sr.
Assistant Examiner—L. Pascal
Attorney, Agent, or Firm—E. Weiss

[57] ABSTRACT

Increasing the capacity of an existing lightwave transmission system can be accomplished by either increasing the bit rate or adding wavelength-multiplexed channels. Recent advances in erbium-doped fiber amplifier technology make the wavelength division multiplexed option particularly attractive. Unfortunately, because of nonuniform wavelength-dependent gain profile and saturation characteristic of erbium-doped fiber amplifiers, each channel of a wavelength-multiplexed system will experience a different optical gain which, in turn, can result in an excessive bit-error-rate performance in some channels. This invention is directed toward processing apparatus which selectively equalizes the optical gain or the optical signal-to-noise ratios of the channels of a wavelength-multiplexed optical transmission system. The output powers and the signal-to-noise ratios are selectively equalized by adjusting the optical input signal powers. With this invention, wavelength-multiplexed channels can be added to an existing optical fiber transmission system without requiring new optical components, upgrades or adjustments at intermediate amplifier sites.

14 Claims, 13 Drawing Sheets

OPTICAL TRANSMISSION SYSTEM EQUALIZER

TECHNICAL FIELD

This invention relates generally to an optical fiber transmission system and more particularly to increasing the capacity of an erbium doped optical fiber transmission system.

BACKGROUND OF THE INVENTION

There is considerable interest in using rare earth doped fiber amplifiers to amplify weak optical signals for both local and trunk optical communications networks. The rare earth doped optical amplifying fibers are low in cost, exhibit low noise, provide relatively large bandwidth which is not polarization dependent, display substantially reduced crosstalk problems, and present low insertion losses at the relevant operating wavelengths which are used in optical communications. Contemplated rare earth doped optical fiber amplifiers can be coupled end-to-end to a transmission fiber and coupled, through a directional coupler, to a laser diode pump. The directional coupler is designed to have a high coupling ratio at the pump wavelength and a low coupling ratio at the signal wavelength so that maximum pump energy is coupled to the amplifier with minimal signal loss. When the amplifying medium is excited with the pump laser, signal light traversing the amplifier experiences a gain. The pump energy may be made to propagate either co-directionally or contra-directionally relative to the signal energy, depending upon whether any remaining unconverted pump light can be more conveniently filtered at the transmitter or the receiver.

A particular area of current concern is that of increasing the capacity of an existing optical fiber communication system. Presently, this can be done by either increasing the bit rate or by adding wavelength division multiplexed (WDM) channels. Recent advances in erbium-doped fiber amplifier technology suggests that increased capacity can best be obtained with WDM channels.

However, a major problem in implementing WDM channels on an optical transmission system is the absence of "gain equalization". More specifically, because of the nonuniform wavelength-dependent gain profile and saturation characteristics of optical fiber amplifiers such as erbium-doped fiber amplifiers, each channel in a WDM system will experience a different optical gain which, in turn, can result in an excessive bit-error rate for channels with low gain. Substantial efforts are presently being expended in developing components which will equalize the powers of WDM channels at each optical amplifier repeater. This invention is directed toward providing a simple, relatively inexpensive solution to the problem of increasing the capacity of an erbium doped optical fiber lightwave system which does not require either new equipment or adjustments at intermediate optical amplifier sites.

SUMMARY OF THE INVENTION

Increasing the capacity of an existing lightwave transmission system can be accomplished by either increasing the bit rate or adding wavelength-multiplexed channels. Recent advances in erbium-doped fiber amplifier technology make the wavelength division multiplexed option particularly attractive. Unfortunately, because of nonuniform wavelength-dependent gain profile and saturation characteristic of erbium-doped fiber amplifiers, each channel of a wavelength-multiplexed system will experience a different optical gain which, in turn, can result in an excessive bit-error-rate performance in some channels. This invention is directed toward processing apparatus which selectively equalizes the optical gain or the optical signal-to-noise ratios of the channels of a wavelength-multiplexed optical transmission system. The output powers and the signal-to-noise ratios are selectively equalized by adjusting the optical input signal powers. With this invention, wavelength-multiplexed channels can be added to an existing optical fiber transmission system without requiring new optical components, upgrades or adjustments at intermediate amplifier sites.

DETAILED DESCRIPTION

As noted above, because of recent technical advances in erbium-doped fiber amplifier technology, considerable effort is being devoted toward adding wavelength division multiplexed (WDM) channels to an existing lightwave system to obtain increased system capacity. However, because of the nonuniform wavelength-dependent gain profile and saturation characteristics of erbium-doped fiber amplifiers, each channel in a WDM system experiences a different optical gain. In a lightwave system of one or more stages of amplification, this differential of optical gain between the various WDM channels can lead to unacceptable bit-error-rate (BER) performance in some of the channels. This absence of "gain equalization" between the various channels is a major obstacle to implementing an amplified WDM lightwave system. At the present time substantial effort is being expended in adding either electronic circuitry or optical elements to the various optical amplifiers of a lightwave system to equalize the powers of WDM channels.

This invention is directed toward equalizing the optical powers or the optical signal-to-noise ratios of WDM channels in an optical fiber amplified lightwave system without requiring either new equipment or adjustments at intermediate amplifier sites.

Briefly, in this invention, the optical powers or the optical signal-to-noise ratios of WDM channels are selectively equalized by judiciously adjusting the input channel powers to achieve equal optical powers or equal signal-to-noise ratios for all channels at the end of the lightwave system. The adjustment of the optical signal of each channel takes into account the total power of all channels together with end-to-end gain for a particular channel normalized by the end-to-end gain for all channels. In those instances where an existing system is upgraded, no additional equipment or adjustments are required at the various optical amplifier repeater sites.

Figure 1:
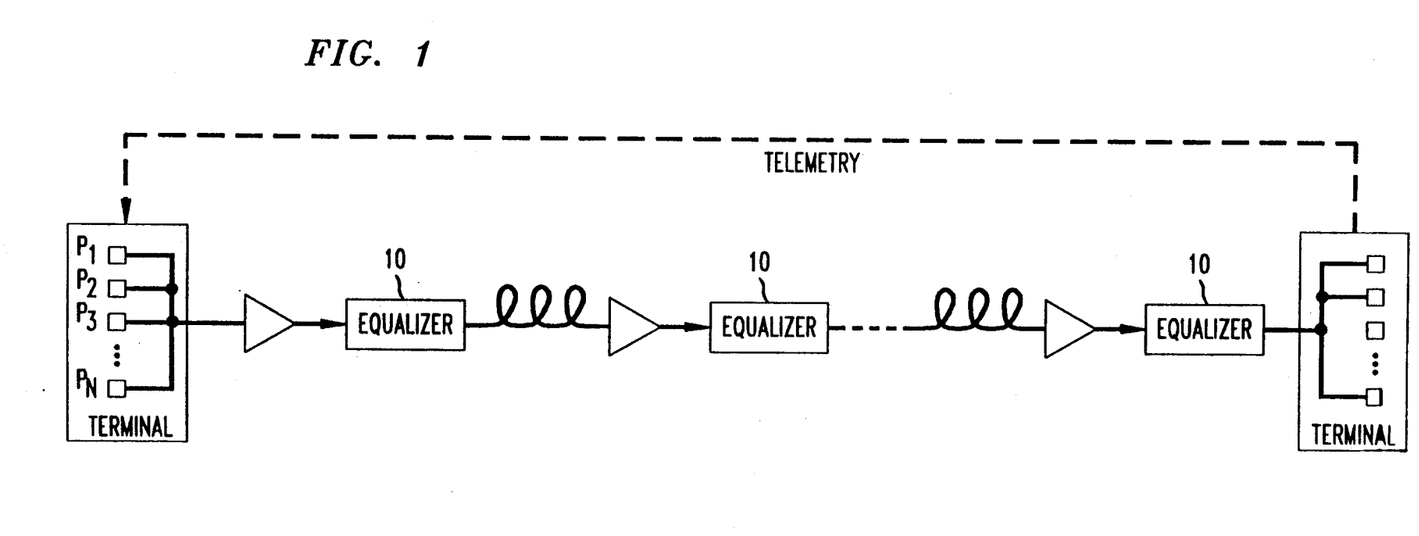
FIG. 1 is a schematic of a generic amplified WDM lightwave system.

Referring to FIG. 1, there is a schematic illustration of a typical suggested amplified WDM lightwave system to which equalizers are added to solve the problems associated with using a WDM system. In this system, a separate equalizer 10 is associated with each optical amplifier 12, and approximately 70 Km of optical fiber 14 separate adjacent optical amplifiers. Prior to this invention, all efforts to solve the problem of gain equalization have centered on equalizing the optical powers in the various channels at each amplifier site with additional components. In FIG. 1, the required equalizers 10 are illustrated as being subsequent to each optical amplifier. Various proposals for an equalizer include "split amplifier" configurations, optical attenuators, smoothing filters such as Fabry-Perot or tunable Mach-Zehnder interferometers, and apparatus for demultiplexing, amplifying and multiplexing at each amplifier site.

Figure 2:
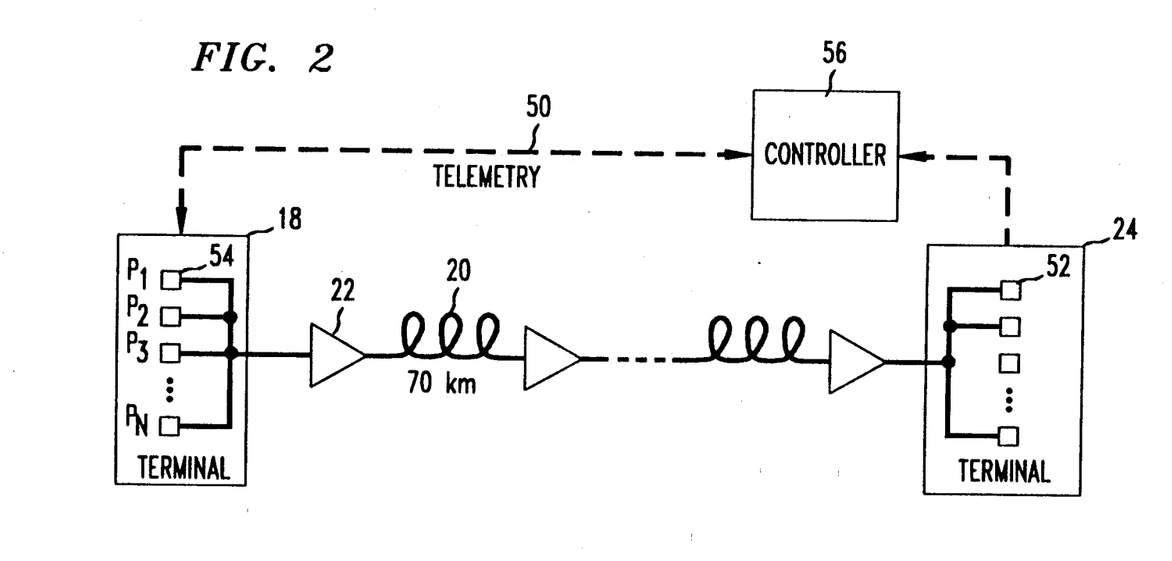
FIG. 2 is a schematic of an amplified WDM lightwave system which includes no equalizers.

An appreciation of the problem and the reason why substantial effort is being spent on its solution is here explained in detail. Referring to FIG. 2, and ignoring the telemetry structure 50, 56 designated with dash lines, there is illustrated a typical prior art amplified WDM lightwave system presently in use. It includes no equalizers. For purposes of illustration, it is assumed that the system consists of eight 1.7 Gb/s channels with 2-nm channel spacing. The channels are passively multiplexed 18 where the total signal power is −3 dBm after multiplexing, and all of the channels are amplified by at least one erbium-doped fiber amplifier 22. The optical fiber transmission path between terminals 18, 24 can be of any commercially available optical fiber. In one embodiment the optical fiber is 70 Km of conventional step-index fiber with dispersion zero at 1.3 μm. The fiber loss and excess losses of approximately 21 dB per 70 Km span 20 are compensated by the erbium-doped fiber amplifiers 22. The total length of the system is arbitrarily set to be approximately 840 km and a demultiplexer 24 at the output end of the system is preceded by a fiber preamplifier. The erbium-doped fiber amplifier or amplifiers 22 in the optical fiber transmission path are of a type which are commercially available. In the embodiment here disclosed the fiber amplifier is approximately 13 m long, have an O.D. of 110 μm, and are pumped with 13.7 dBm of 1.48 μm pump light. There is no filter at any of the amplifier sites.

Figure 3:
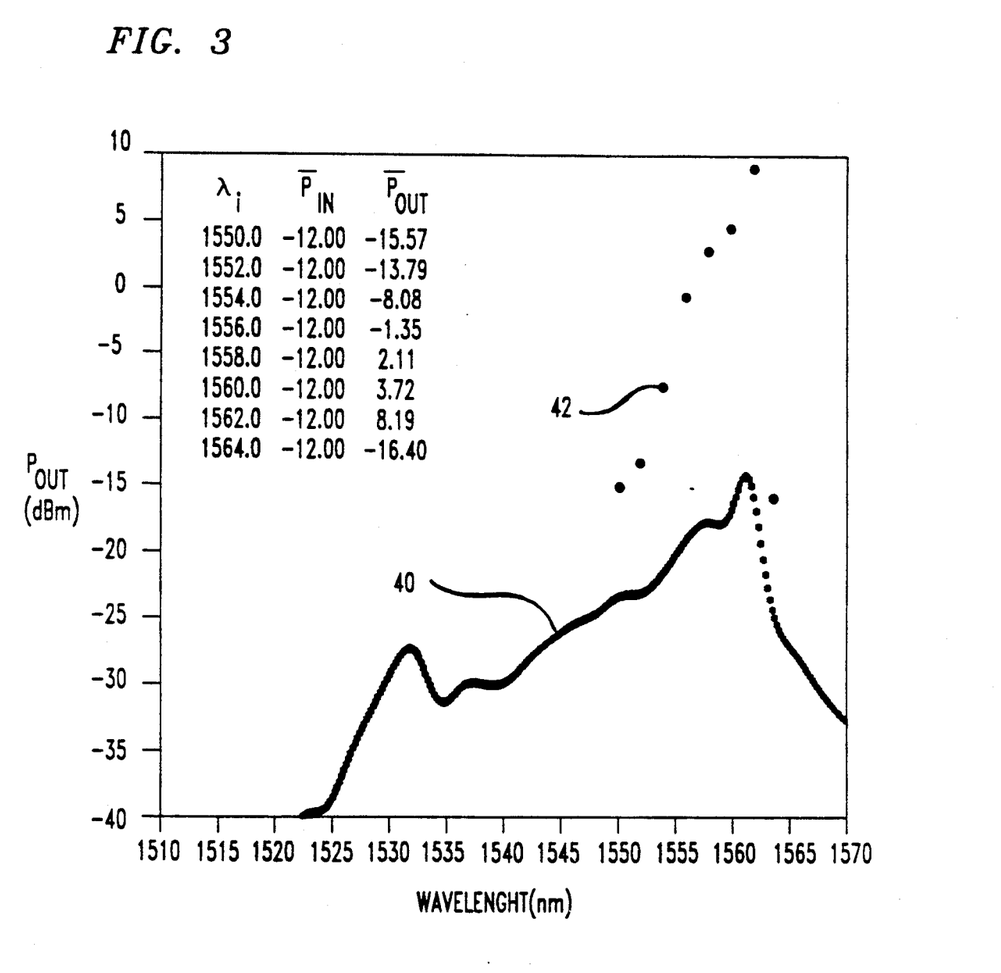
FIG. 3 is a plot of calculations of amplified spontaneous emission and signal powers at the output end of an optical fiber transmission system.

When calculating the bit-error-rate BER, a 41 GHz optical filter and a 1 GHz electrical filter for each channel is assumed. Referring to FIG. 3, there is illustrated the calculated results of amplified spontaneous emission (curve 40) in a 0.2 nm optical bandwidth and the signal powers 42 at the demodulator terminal 24 which is 840 Km from the input. The curves are a plot of power out vs wavelength. The table insert in the upper left corner of FIG. 3 is of the power in ($P_{in}$) and the power out ($P_{out}$) for eight different signal wavelengths. It is to be noted that there is 24 dB variation of output signal powers between the various signals.

Returning to FIG. 2, there is illustrated structure in accordance with the principles of the invention in combination with a typical amplified optical fiber transmission system. A telemetry link 50 is established between the detector 52 of each channel at the output end of the system and a power adjuster 54 of each channel at the input end of the system. The power adjuster 54 can be either optical amplifiers or optical attenuators or any device which can be used to selectively increase or decrease the power of the optical signal of the associated optical channel. Located in the telemetry link is a microprocessor control 56 coupled to receive signal information from each detector 52 and each optical power adjuster 54 of each channel and to send control signals to each optical power adjuster 54 to control the power of the signal of each channel. In operation, the optical power of one channel may be increased while that of another channel is decreased, left constant or also increased. The microprocessor is constructed to generate a specific control signal which is determined by the various received signals according to a relationship which is more fully identified below. With the structure of FIG. 2, including the telemetry link 50 and its associated parts, the variation of output powers of 24 dB (from FIG. 3) can be minimized by adjusting the input signal powers where the new input signal power of any one channel, the i-th channel, is given by the relationship:

$$P^i_{new} = P_{TOT} \left[ \frac{1/G_i}{\sum_{i=1}^{T} 1/G_i} \right] \quad (A)$$

where $P_{TOT}$ is the total signal power [−3 dBm], T is the total number of channels, and $G_i$ is the optical gain experienced by the i-th signal (which can be determined from the table insert of FIG. 3), $G_i = P_{out}/P_{in}$. The denominator of the relationship is chosen to maintain constant total input power.

Figure 4:
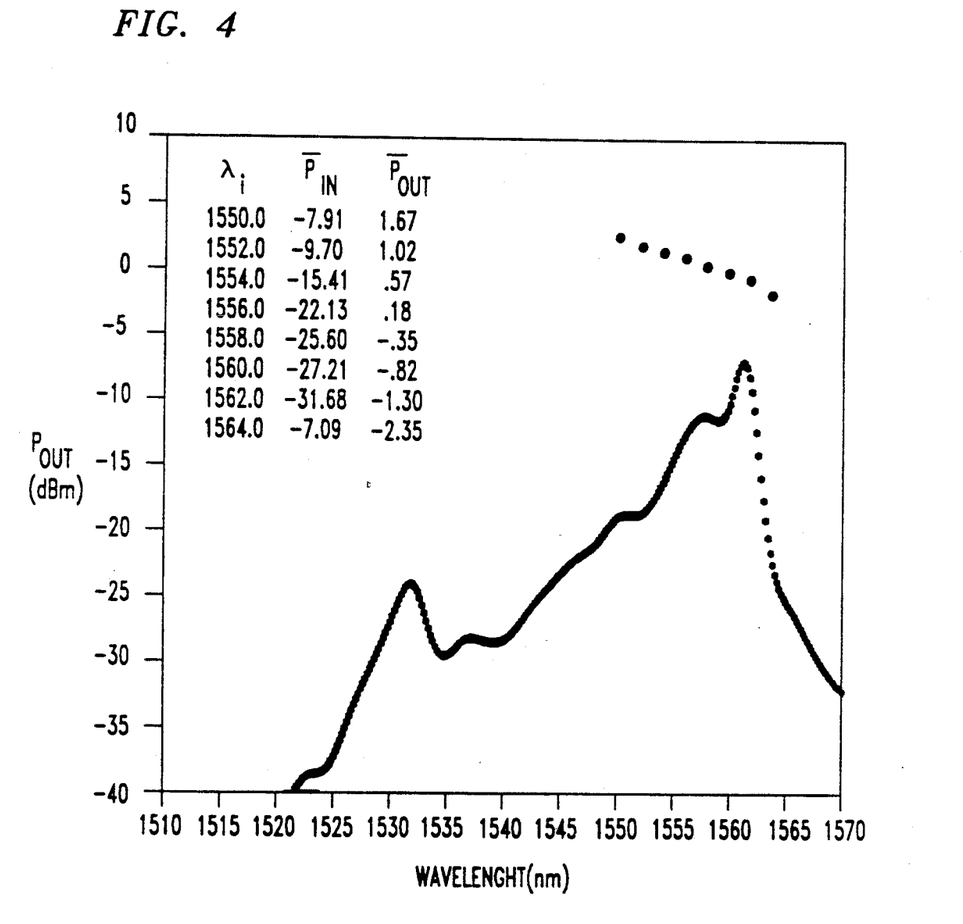
FIG. 4 illustrates the output powers of a transmission system adjusted in accordance with the principles of the invention.

FIG. 4 illustrates the output powers when the input powers are adjusted according to the relationship noted above.

Figure 5:
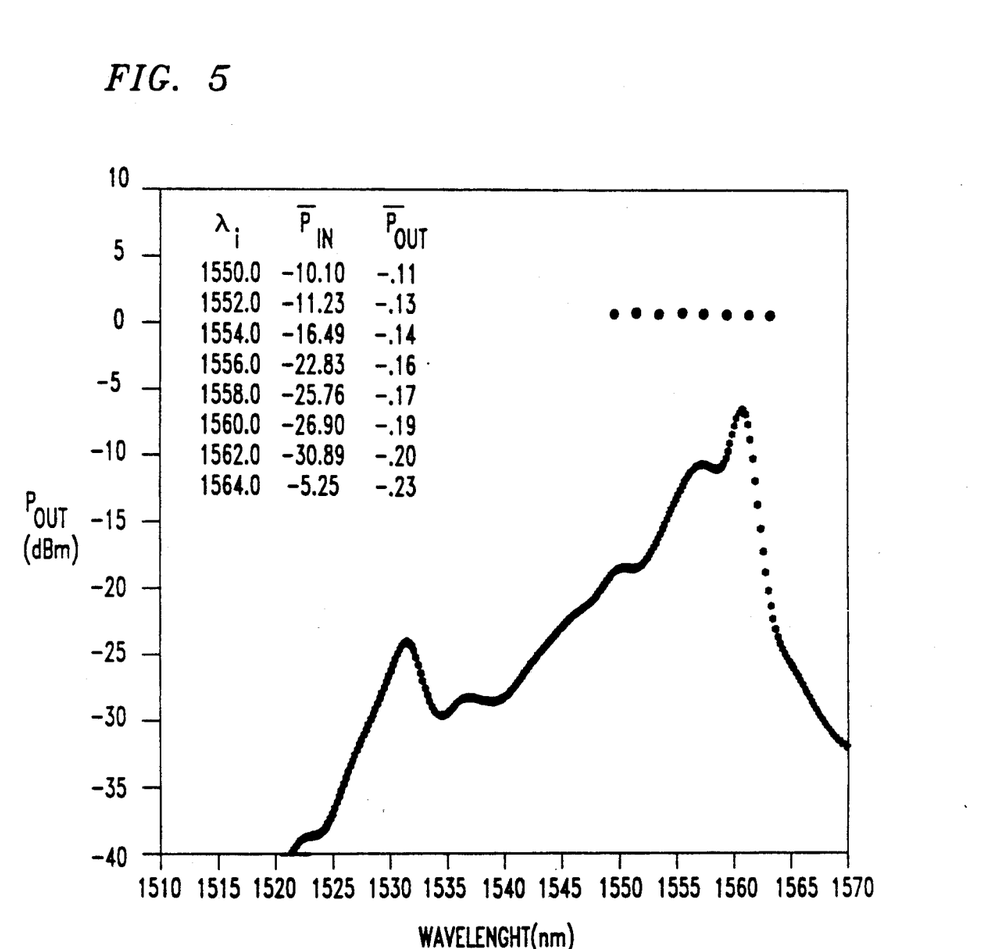
FIG. 5 illustrates the output powers of the transmission system of FIG. 4 which has been subjected to another adjustment.

It is to be noted that the variation in output powers is now only 4 dB. Further improvement can be obtained by again applying the relationship A. To do so, the signals at the output end of the transmission path are measured, and these new measurements are used with relationship A to readjust the input signal. Thus, it can be stated that the signal of each channel is fine tuned by recalculating and applying the relationship a second time. FIG. 5 is a plot of $P_{out}$ (the power out) relative to wavelength after relationship A has been recalculated and applied a second time. At this time, the output power variations are 0.12 dB. Recalculating and applying the relationship a third time equalizes the various output powers to within 0.01 dB. See FIG. 6.

Figure 6:
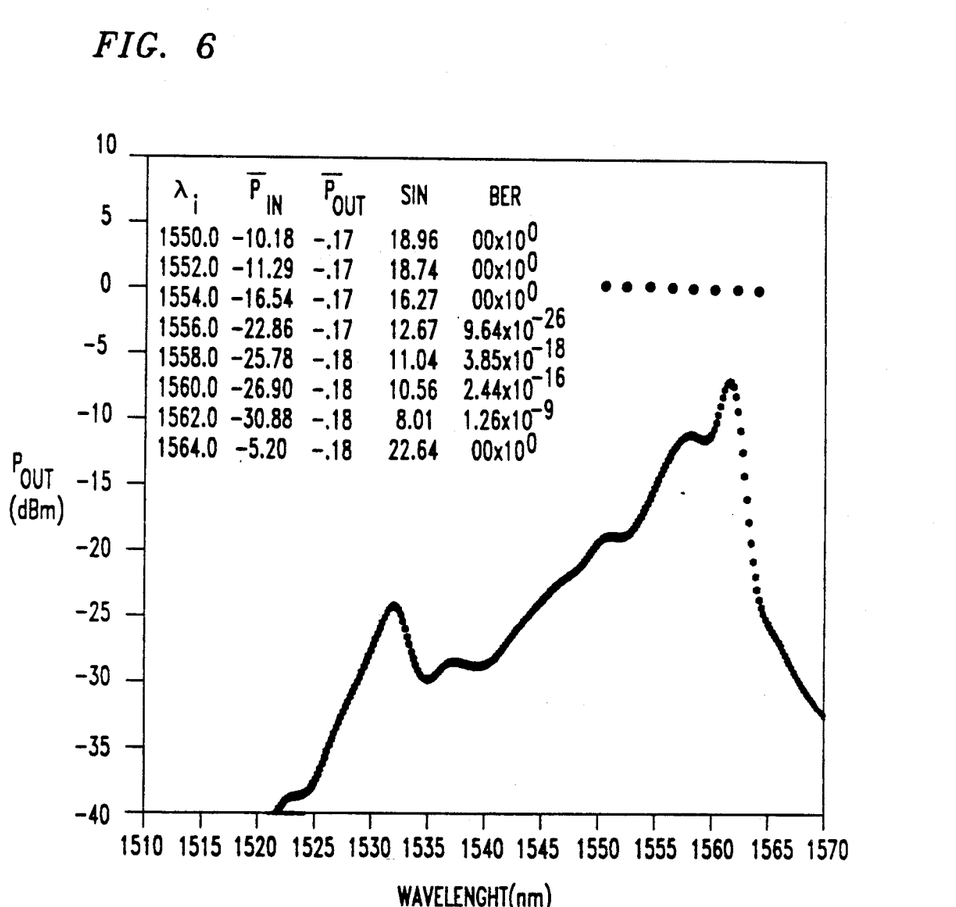
FIG. 6 illustrates the output powers of the transmission system of FIG. 5 which has been subjected to yet another adjustment.

It is noted that although all of the output powers are equalized, one of the channels has a relatively high and, therefore, possibly unacceptable bit-error rate (BER) which is due to the low signal-to-noise ratio (SNR). See the insert table in the upper left corner of FIG. 6. The SNR values in FIG. 6 are the ratio of the signal powers to the amplified spontaneous emission in a 0.2 nm optical bandwidth. Thus, equalizing output powers does not necessarily produce optimum overall system performance.

Therefore, in some instances, it may be desirable to equalize the output SNR rather than the output powers.

Figure 7:
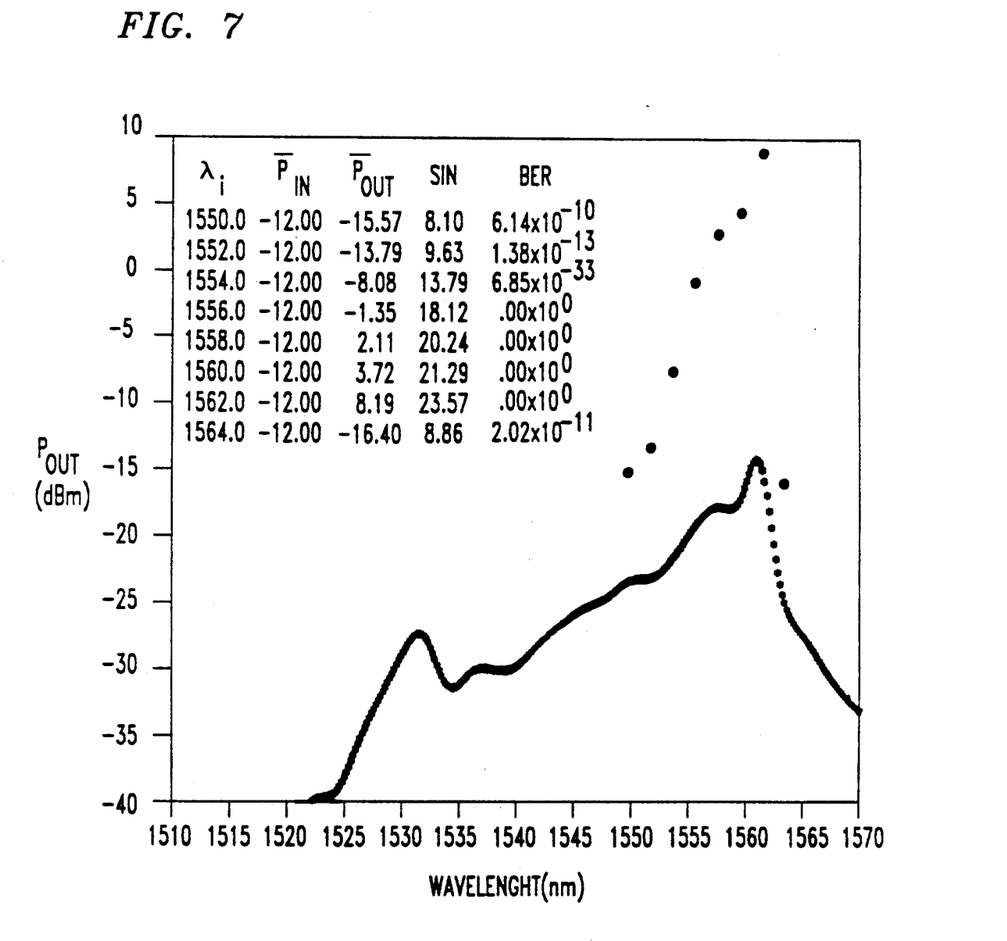
FIG. 7 illustrates the SNR and BER of eight channels of an optical transmission system when input powers are equal.

Referring to FIG. 7, there is illustrated a plot of $P_{out}$ vs wavelength, when the input powers are equal. The table of insert data in FIG. 7 gives the SNR and BER for the eight channels. Note, three of the channels have relatively high BER. Again, with the structure of FIG. 2, including the telemetry link 50 and its associated parts, the BER of any channel can be reduced by equalizing the SNR where the microprocessor solves the relationship:

$$P^j_{new} = P_{TOT} \left[ \frac{P^j/(S/N)_i}{\sum_{i=1}^{T} P^i/(S/N)_i} \right] \quad (B)$$

where $P_{new}$ is the new input signal power to the selected (i-th) channel; $(S/N)_i$ is the SNR of the i-th channel; and $P_{TOT}$ is the total signal power, and T is the total number of channels.

The denominator of the relationship ensures a constant total input power to the system.

Again, as with relationship A, the optical power of one channel may be increased while that of another channel is decreased, left constant or also increased.

With relationship B, the SNR can be equalized by adjusting only the input transmitter powers.

Figure 8:
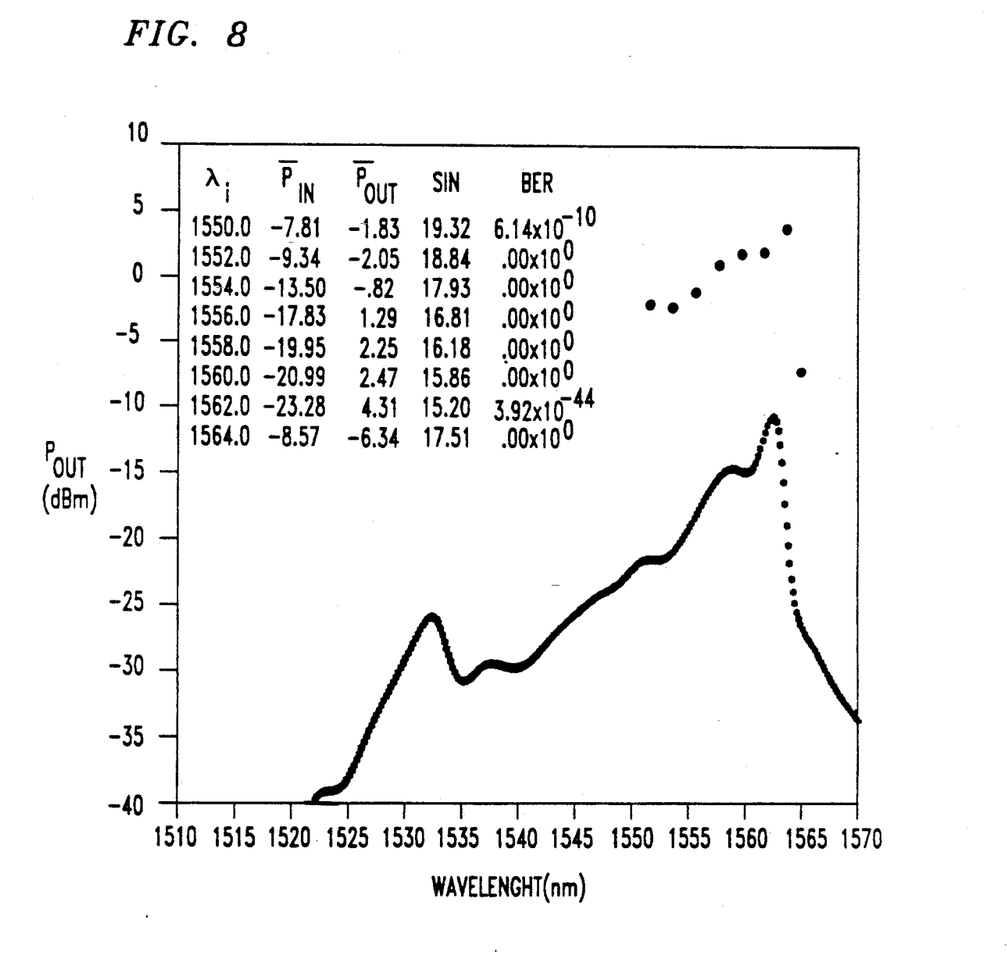
FIG. 8 illustrates the results of FIG. 7 after a single adjustment of input powers in accordance with the principles of the invention.
Figure 9:
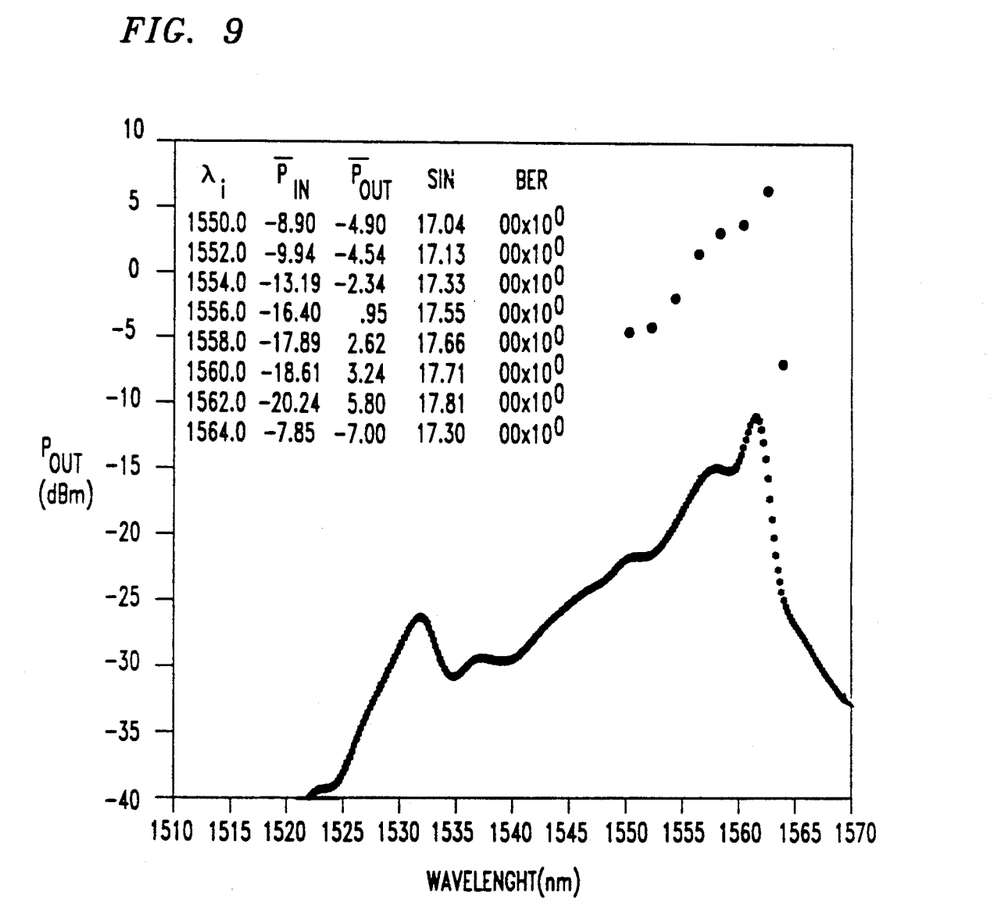
FIG. 9 illustrates the results of a second adjustment of transmitter powers.
Figure 10:
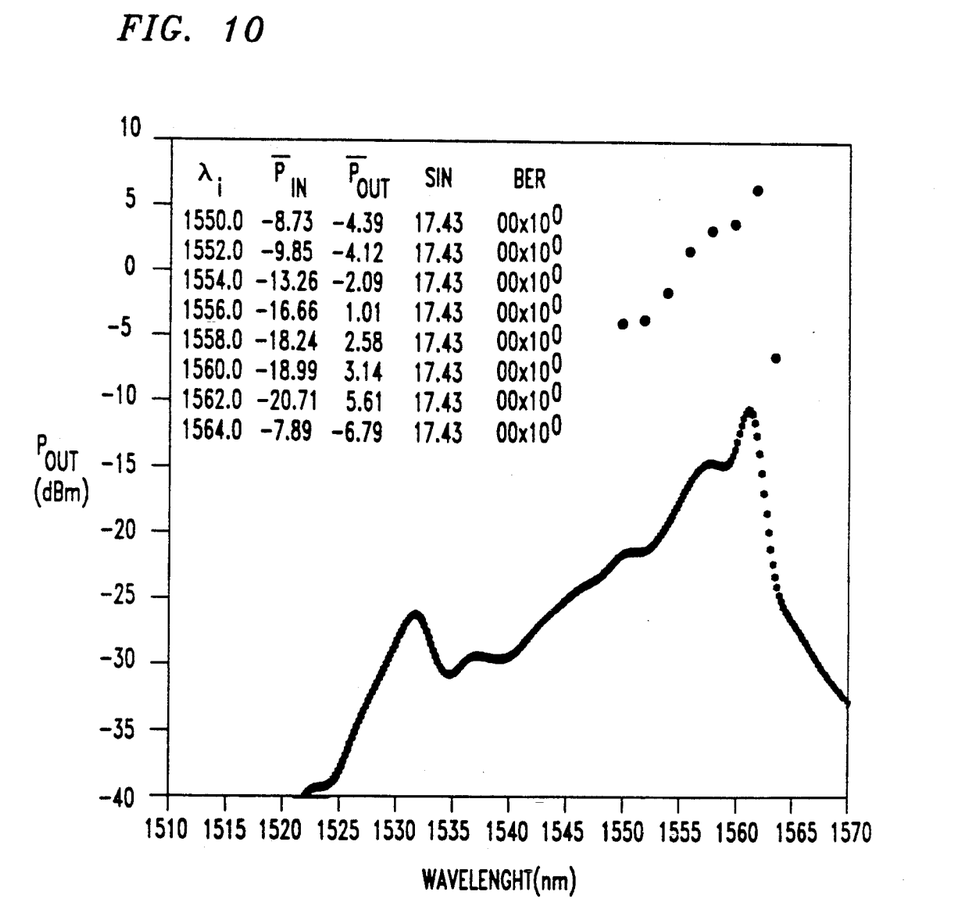
FIG. 10 illustrates that several adjustments of input powers in accordance with the principles of the invention results in identical signal-to-noise ratios.

FIG. 8 is a plot of $P_{out}$ vs wavelength after a first adjustment of input powers using relationship B. Although there is about 4 dB variation in the SNR, even the poorest channel has an acceptable BER. See the table of insert data in the upper portion of FIG. 8. As before, relationship B can be applied iteratively with successively new values to obtain increasingly improved results. FIG. 9 illustrates the results after the data from the first adjustment was used to fine tune the relationship to provide a second adjustment of transmitter powers. Clearly, all channels are error free. Several iterations of the relationship results in identical SNR for each channel as illustrated in FIG. 10.

If equal output powers as well as equal SNR are desired, a second set of variable optical attenuators similar to those at the transmitter terminal can be used at the receiving terminal. The output powers can be equalized without affecting the SNR.

Figure 11:
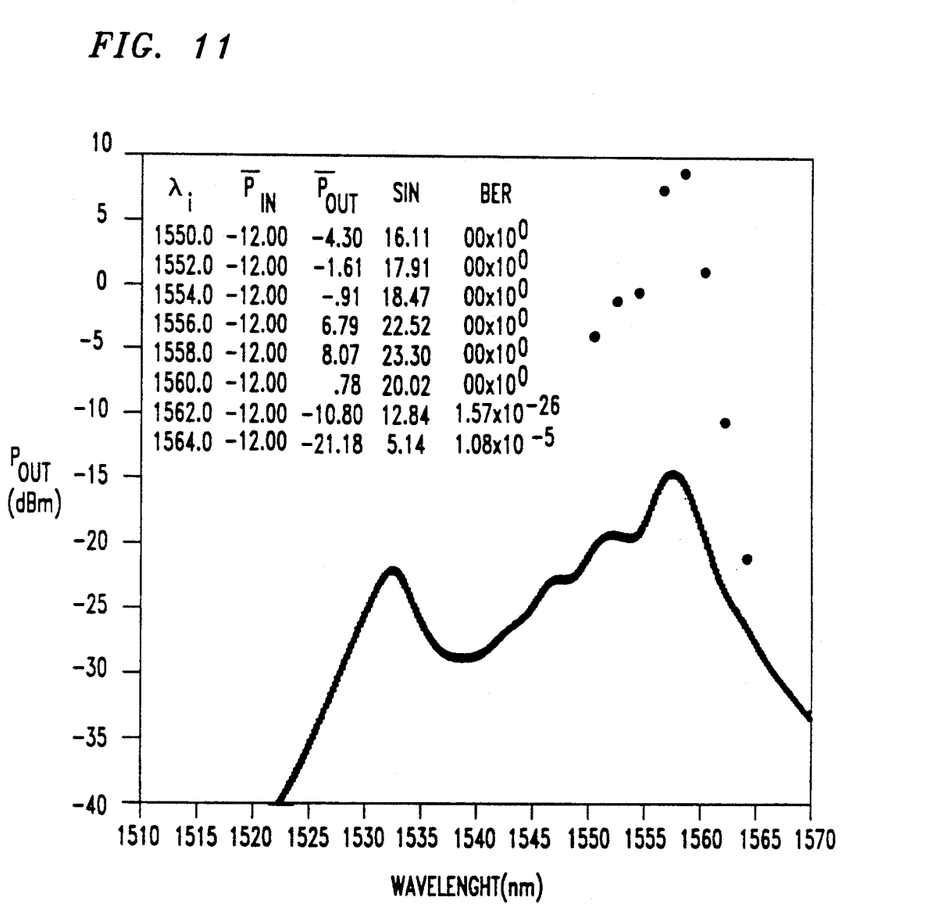
FIGS. 11 and 12 illustrate equalization of an optical transmission system having another type of optical amplifier in accordance with the principles of the invention; and, FIG. 13 is a plot of the output signal-to-noise ratio for each channel as a function of total input power of an optical transmission system.
Figure 12:
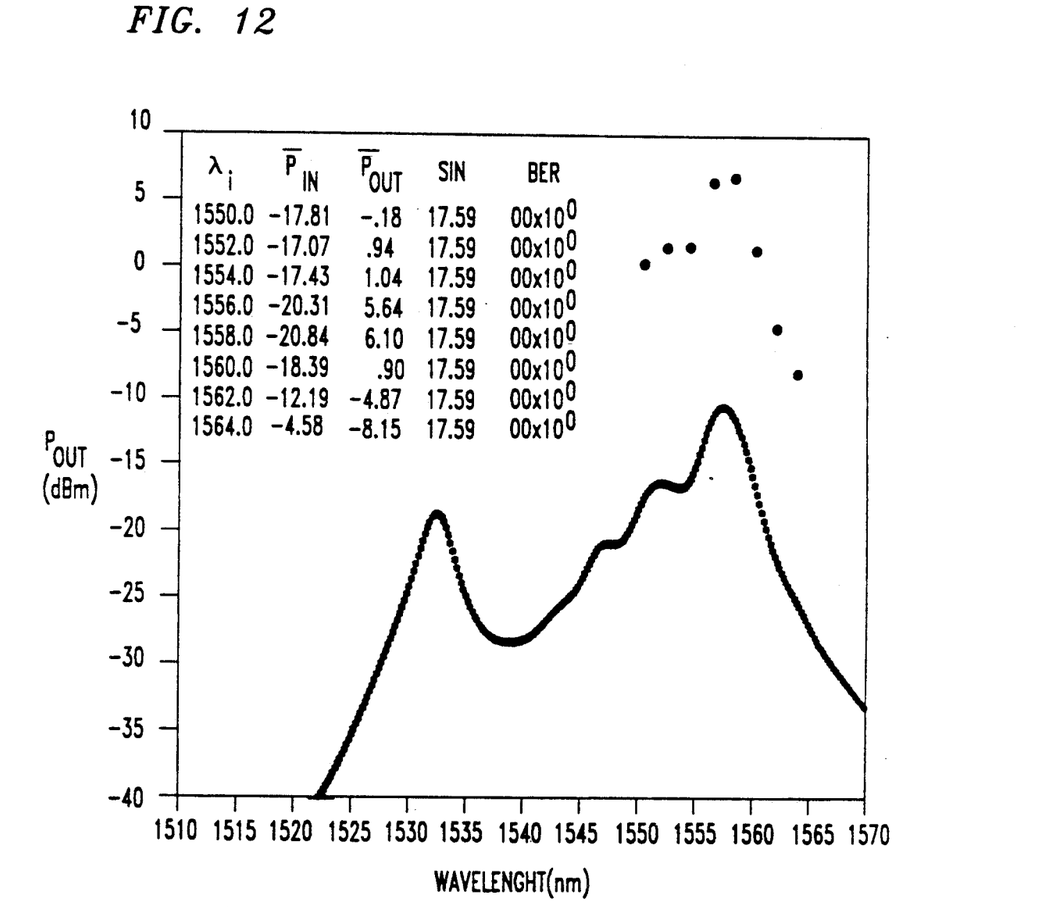

The equalization of signals here disclosed is not sensitive to system parameters. For example, removing all excess loss or reducing the total input power into the system by an order of magnitude does not impair or adversely affect the signal processing using either relationship A or B. The two disclosed relationships apply equally well to other types of erbium-doped fiber amplifier. For example, FIGS. 11 and 12 illustrate the equalization of SNR for 831-type amplifiers which, initially, produce more extreme fluctuations than 106-type amplifiers.

Relationships A and B here disclosed provide an end-to-end solution to the problem of equalization. One factor which may have an effect on the result is the time constant of the amplifier. Thus, it is suggested that the time constant of the amplifier should be longer than the slowest components of the data streams. It is noted that this condition is satisfied for erbium-doped fiber amplifiers in systems with bit rates of 1 Mb/s or higher.

Figure 13:
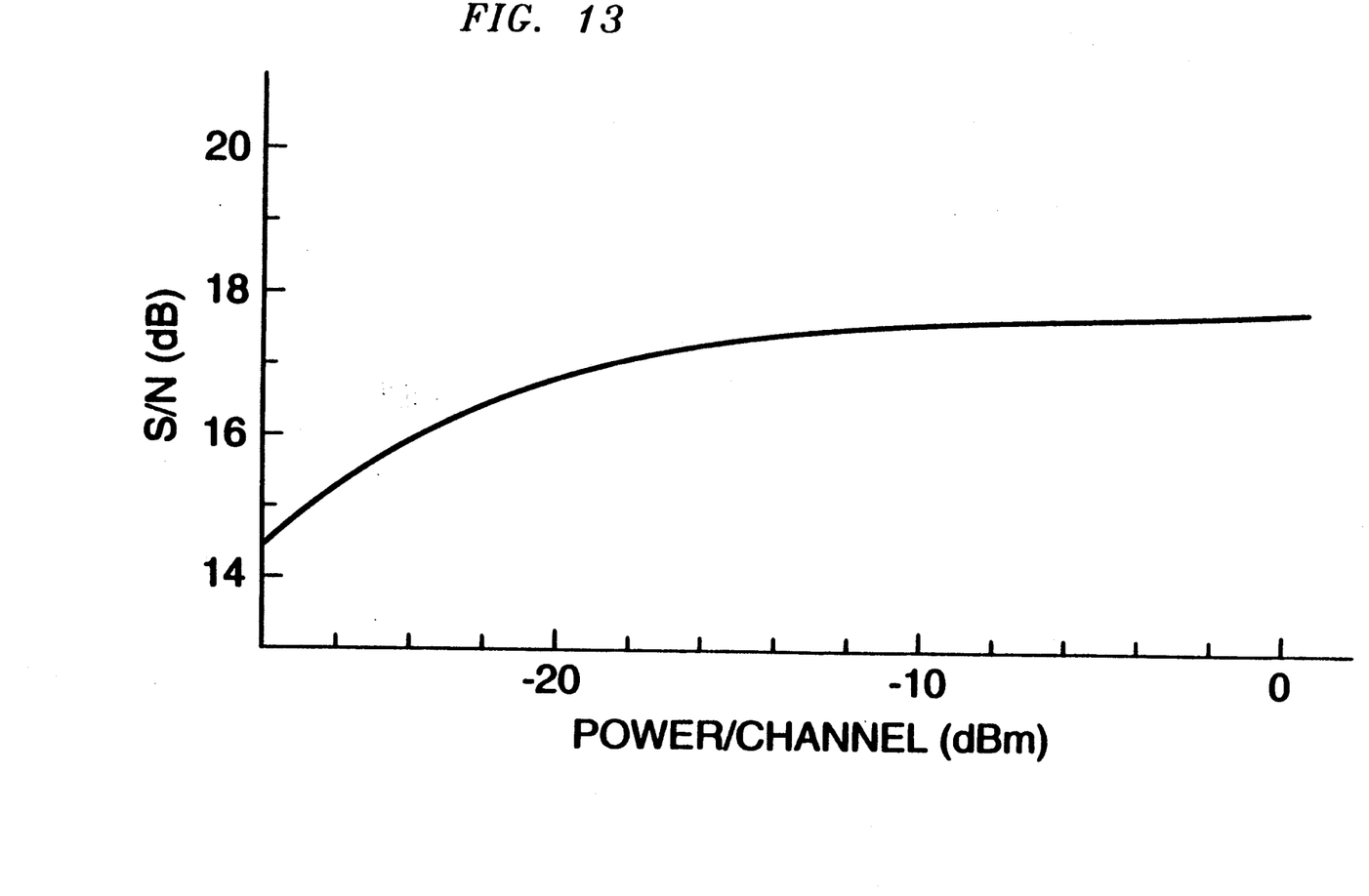

Evidence that the equalization technique is not sensitive to input power is illustrated in FIG. 13 which is a plot of the output SNR for each channel as a function of total input power. It is to be noted that the output SNR is greater than 16 dB for input powers as low as −19 dBm per channel.

The invention here disclosed is a simple, inexpensive method of equalizing SNR or output powers in amplified WDM lightwave system without adding other components to the transmission path. All of the adjustments are made at the terminals using information provided by telemetry. No new equipment or adjustments at intermediate amplifier sites are required and the entire equalization procedure is amenable to control by either two separate microprocessors or a single microprocessor.

What has been described is merely illustrative of the application of the principles of the present invention. Other arrangements and methods can be implemented by those skilled in the art without departing from the spirit and scope of the present invention.

We claim:

1. Signal processing apparatus comprising
    means for combining at least two channels of lightwave information signals of different frequencies to form a wavelength division multiplexed (WDM) signal and applying the WDM signal to an optical transmission path having a nonuniform wavelength dependent gain profile,
    means for receiving the WDM signal from said optical transmission path and separating the WDM signal into its separate channel signals,
    means for measuring a predetermined characteristic of each separated channel signal, and
    means responsive to the measured characteristic to generate a control signal which is applied to adjust the power of the signal of each channel being applied to the transmission path, the adjustment of the power being such that it causes the measured predetermined characteristic to become substantially the same for each channel of the WDM signal.

2. The apparatus of claim 1 wherein said
    means for measuring measures the power of each separated channel signal.

3. The apparatus of claim 1 wherein said
    means for measuring measures the signal-to-noise ratio of each separated signal.

4. The apparatus of claim 2 wherein said means for combining at least two channels of lightwave information signals at different frequencies comprises signal power adjuster means coupled to selectively adjust the power of the signal of each channel, said adjuster being coupled to be responsive to the generated control signal.

5. The apparatus of claim 3 wherein said means for combining at least two channels of lightwave information signals at different frequencies comprises signal power adjuster means coupled to selectively adjust the power of the signal of each channel, said adjuster being coupled to be responsive to the generated control signal.

6. A signal processing apparatus for processing an amplified wavelength division multiplexed lightwave signal of at least two channels of information signals, comprising a first optical signal power adjuster coupled to control the power of the signal of said first channel and a second optical signal power adjuster coupled to control the power of the signal of said second channel, a multiplexer coupled to combine said first and second optical signals into a wavelength-multiplexed signal, a demultiplexer coupled to separate a wavelength-multiplexed signal into separate signals, first and second detectors coupled to receive the separate signals from said demultiplexer, an optical fiber transmission line having at least one optical fiber amplifier interposed between said multiplexer and said demultiplexer, processor means coupled to said first and second optical signal power adjusters and said first and second detectors for carrying out an operation represented by a first relationship:

$$P^j_{new} = P_{TOT}\left[\frac{1/G_i}{\sum_{i=1}^{T} 1/G_i}\right]$$

where $P_{new}^j$ is the new input signal power of an information signal of a channel;

$P_{TOT}$ is the total signal power;

T is the total number of channels; and $G_i$ is the optical gain experienced by the information signal;

and a second relationship:

$$P^j_{new} = P_{TOT}\left[\frac{P^j/(S/N)_i}{\sum_{i=1}^{T} P^j/(S/N)_i}\right]$$

where $P_{new}^j$ is the new input signal power of an information signal of a channel;

$P_{TOT}$ is the total signal power;

T is the total number of channels; and

S/N is the signal-to-noise ratio of the information signal.

7. The apparatus of claim 6 comprising:
means coupled to said processor means for selectively carrying out one of said two relationships.

8. The apparatus of claim 7 comprising
means for carrying out only said first relationship.

9. The apparatus of claim 7 comprising
means for carrying out only said second relationship.

10. The apparatus of claim 7 wherein said at least one rare earth doped optical fiber amplifier has a time constant
which is longer than the slowest component of the data stream.

11. The apparatus of claim 10
wherein said optical amplifiers are rare earth doped optical fiber amplifiers.

12. The apparatus of claim 7
wherein said optical fiber amplifiers are doped with erbium and the wavelength-multiplexed signal has a rate which is at least a megabit-per-second.

13. A signal processing apparatus for processing an amplified wavelength division multiplexed lightwave signal of at least two channels of information signals, comprising a first optical signal power adjuster coupled to control the power of the signal of said first channel and a second optical signal power adjuster coupled to control the power of the signal of said second channel, a multiplexer coupled to combine said first and second optical signals into a wavelength-multiplexed signal, a demultiplexer coupled to separate a wavelength-multiplexed signal into separate signals, first and second detectors coupled to receive the separate signals from said demultiplexer, an optical fiber transmission line having at least one optical fiber amplifier interposed between said multiplexer and said demultiplexer, processor means coupled to said first and second optical signal power adjusters and said first and second detectors for carrying out an operation represented by a relationship:

$$P^j_{new} = P_{TOT}\left[\frac{P^j/(S/N)_i}{\sum_{i=1}^{T} P^j/(S/N)_i}\right]$$

where $P_{new}^j$ is the new input signal power of an information signal of a channel;

$P_{TOT}$ is the total signal power;

T is the total number of channels;

S/N is the signal-to-noise ratio of the information signal; and the wavelength-multiplexed signal has a rate of at least a megabit-per-second.

14. A signal processing apparatus for processing an amplified wavelength division multiplexed lightwave signal of at least two channels of information signals, comprising a first optical signal power adjuster coupled to control the power of the signal of said first channel and a second optical signal power adjuster coupled to control the power of the signal of said second channel, a multiplexer coupled to combine said first and second optical signals into a wavelength-multiplexed signal, a demultiplexer coupled to separate a wavelength-multiplexed signal into separate signals, first and second detectors coupled to receive the separate signals from said demultiplexer, an optical fiber transmission line having at least one optical fiber amplifier interposed between said multiplexer and said demultiplexer, processor means coupled to said first and second optical signal power adjusters and said first and second detectors for carrying out an operation represented by a relationship:

$$P_{new}^j = P_{TOT}\left[\frac{1/G_j}{\sum_{i=1}^{T} 1/G_i}\right]$$

where
 $P_{new}^j$ is the new input signal power of an information signal of a channel;
 $P_{TOT}$ is the total signal power;
 T is the number of channels,
 $G_i$ is the optical gain experienced by the information signal; and
 the wavelength-multiplexed signal has a rate of at least a megabit-per-second.

* * * * *